INVENTORS
BENJAMIN H. KRYZER
THOMAS W. TECHLER
RICHARD G. THOMPSON
BY John E. Strypher
ATTORNEY Oct. 10, 1961     B. H. KRYZER ET AL     3,003,638
BRINE SUPPLY SYSTEM FOR FLUID TREATMENT APPARATUS
Filed March 18, 1957     3 Sheets-Sheet 2
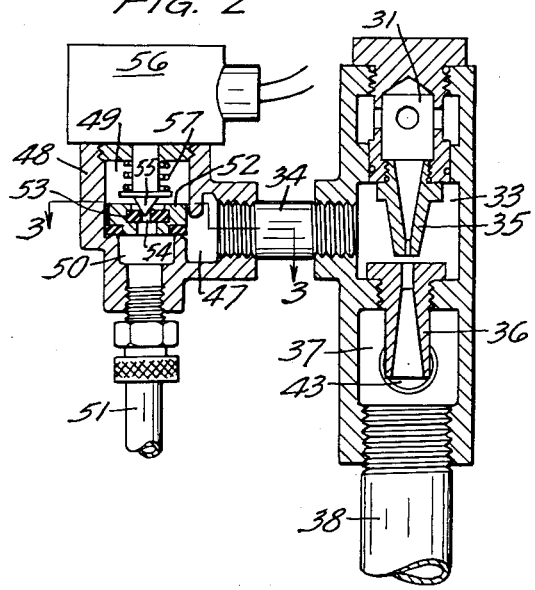
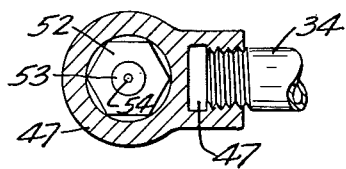
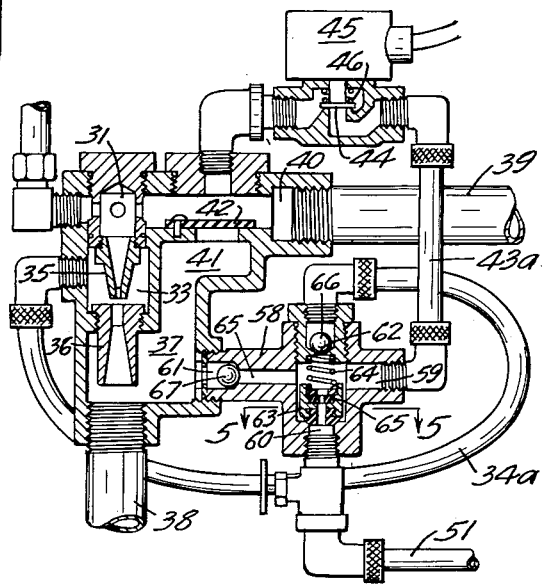
INVENTORS
BENJAMIN H. KRYZER
THOMAS W. TECHLER
RICHARD G. THOMPSON
BY John E. Kryzer
ATTORNEY Oct. 10, 1961   B. H. KRYZER ET AL   3,003,638
BRINE SUPPLY SYSTEM FOR FLUID TREATMENT APPARATUS
Filed March 18, 1957   3 Sheets-Sheet 3
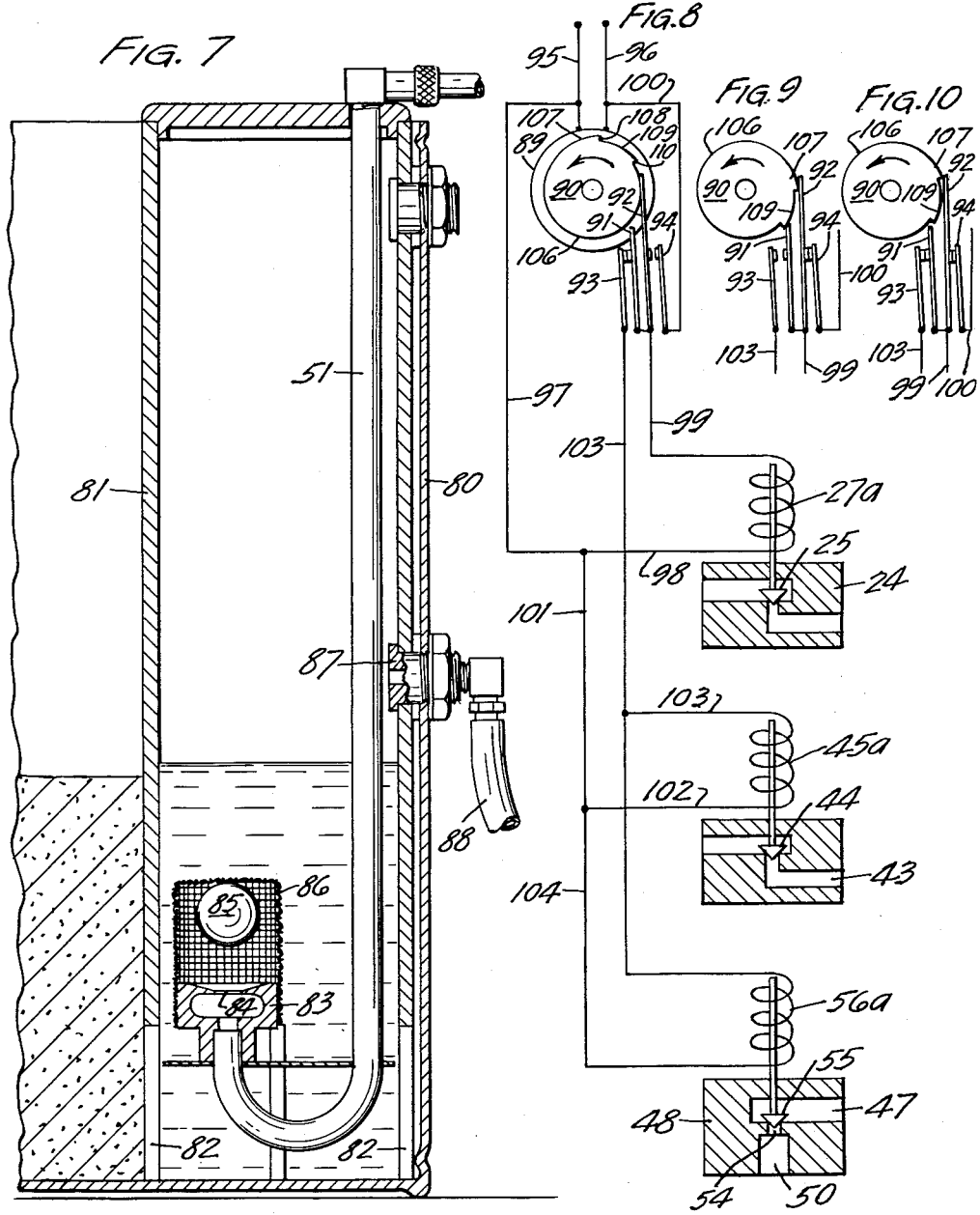
INVENTORS
BENJAMIN J. KRYZER
THOMAS W. TECHLER
RICHARD G. THOMPSON
BY John E. Stryker
ATTORNEY United States Patent Office 3,003,638
Patented Oct. 10, 1961

3,003,638
BRINE SUPPLY SYSTEM FOR FLUID TREATMENT APPARATUS
Benjamin H. Kryzer, St. Paul, Thomas W. Techler, North St. Paul, and Richard G. Thompson, Stillwater, Minn., assignors, by mesne assignments, to Union Tank Car Company, Chicago, Ill., a corporation of New Jersey
Filed Mar. 18, 1957, Ser. No. 646,881
7 Claims. (Cl. 210—139)

This invention relates to an improved system for supplying brine or other regenerating liquid to water softening or other fluid treatment apparatus.

Heretofore the systems for supplying regenerating liquid from the supply tank to the treatment tank of such apparatus have been of two general types. One of these has a closed brine tank which is normally under pressure so that any required amount of brine may be withdrawn and caused to flow through the softener tank merely by actuating a valve, either timer controlled or float controlled. Make-up water for a closed brine tank is usually supplied under control of a float operated valve located in the tank. The other common type employs an open brine tank and an aspirator or pump adapted to withdraw brine from the tank as required for regeneration in the softener. In this case, also, the make-up water for the brine withdrawn from the brine tank is usually supplied under control of a float valve which cuts off the flow to the brine tank when liquid therein reaches a predetermined maximum elevation. In either case operation of float valves under the conditions existing in brine tanks is not entirely satisfactory due to the lodging of sediment and particles of salt on the valve closure members and seats with resulting failure to afford control of the quantity and concentration of the brine used in each regenerating operation.

It is an object of the present invention to overcome the difficulties attendant upon the use of float valves for the control of the level of brine in brine tanks by providing a brine supply system wherein make-up water is fed to the brine tank at a preselected rate which is adjusted for the pressure of the available water supply and caused to flow into the brine tank for a preselected period of time as determined by automatic timing means.

A further object is to provide in apparatus of the class described a novel, simple and reliable brine control valve adapted to coact with a brine injector of the aspirator type and with automatic timing means for the duration of the flow of make-up water into the brine tank.

The invention also includes certain other novel features of construction which will be described and claimed in the following specification.

Referring to the accompanying drawings which illustrate, by way of example and not for the purpose of limitation, a preferred and modified embodiment of our improved brine supply system:

FIG. 2 is a fragmentary vertical sectional view taken on the line 2—2 of FIG. 1 showing a preferred brine flow control valve;

FIG. 3 is a fragmentary horizontal sectional view taken on the line 3—3 of FIG. 2;

FIG. 4 is a part vertical sectional view and part side elevational view showing a modification of the brine control valve and associated controls;

FIG. 5 is a fragmentary horizontal section taken on the line 5—5 of FIG. 4;

FIG. 6 is a part vertical sectional view and part elevational view showing another modification of the brine control valve;

FIG. 7 is a fragmentary vertical sectional view showing a portion of the brine tank and well and a portion of the brine conduit;

FIG. 8 is a diagrammatic illustration of the timing means including suitable electric circuits, switches, cam and actuating means for the several solenoid valves, the cam being shown in the service position, and FIGS. 9 and 10 show the cam and switches in the regenerating and backwashing positions respectively.

Figure 1:
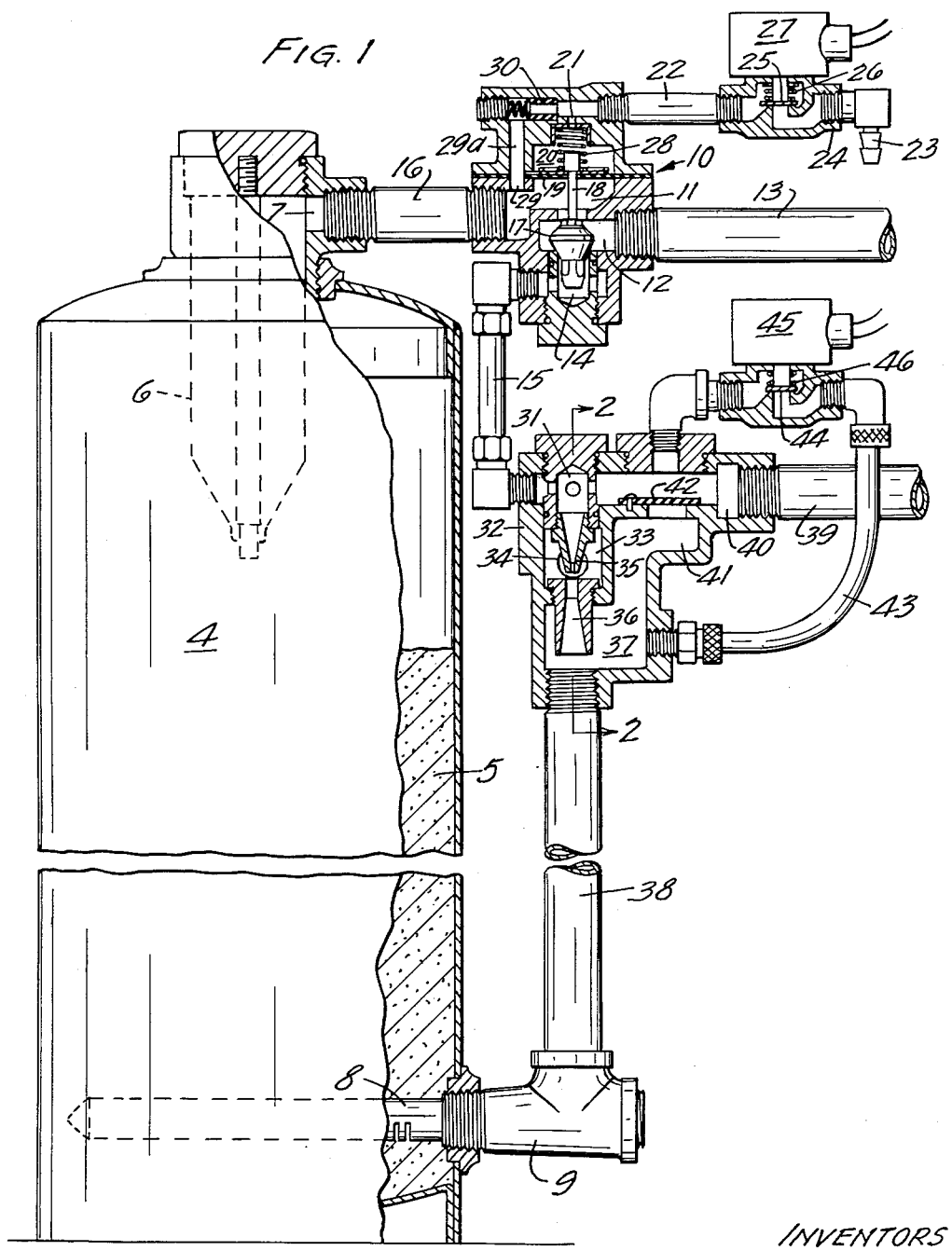
FIGURE 1 is a part side elevational view and part vertical sectional view showing the portions of suitable controls associated with a softener or treatment tank and the main timer controlled valves.

As shown in FIG. 1, our controls are connected to a tank 4 containing a bed of softening material 5. Extending into the upper portion of the tank is a distributor 6 communicating with an inlet fitting 7 and a second distributor 8 communicates with the lower portion of the tank and is connected to a tank outlet fitting 9. The flow controls may include a main valve indicated generally at 10. This has a first chamber 11, communicating with the tank inlet fitting 7, a second chamber 12 in continuous communication with a supply pipe 13 for fluid under pressure, and a third chamber 14 in continuous communication with a conduit 15. A conduit 16 extends from the chamber 11 to the tank inlet fitting 7. Movable in the chamber 12 is a head 17 adapted to selectively place this chamber in communication with the chamber 11 or chamber 14. The head 17 is fixed on the lower end of a stem 18 and the latter is connected centrally to a flexible diaphragm 19 adapted to actuate the valve head in response to differences in pressure at opposite sides of the diaphragm.

One side of the diaphragm 19 is exposed to fluid pressure in the chamber 11 and the other side to pressure in a chamber 20. A passage 21 connects the chamber 20 with a waste outlet conduit 22 and flow through this conduit to a waste outlet 23 is under control of a valve indicated generally at 24. The valve 24 is of the solenoid actuated type having a head 25 which is connected to the plunger of the solenoid and biased toward closed position by a coiled spring 26. A solenoid coil 27a (FIG. 8) in a housing 27 is adapted to be energized as hereinafter described by suitable time control mechanism and an electric circuit.

Confined in the chamber 20 of valve 10 is a coiled spring 28 which biases the head 17 of this valve to the position shown in FIG. 1 wherein the supply pipe 13 is in communication with the tank inlet 7 through the chambers 12 and 11 and conduit 16. When the head 17 is actuated to a second position, direct communication between the chambers 11 and 12 is closed and chamber 12 is in communication with chamber 14 and conduit 15.

A waste port 29 is formed in the casing of the valve 10. This port is connected by passage 29a to the inlet side of a flow control device 30 which is arranged to discharge into the waste conduit 22. This flow control device is constructed from resilient compressible material so that its axial passage is restricted in response to progressive increases in pressure in the passage 29a when the waste control valve 24 is open. Flow control device 30 is designed to permit flow to waste at the rate best suited to backwashing of the softening material in the tank 4.

Conduit 15 connects chamber 14 with an inlet chamber 31 formed in the upper portion of an aspirator device having a casing 32. A suction chamber 33 formed in the casing 32 is supplied with regenerating fluid from a conduit 34 and an aspirator nozzle 35 is arranged in the chamber 33 to discharge into a throat fitting 36 which discharges into an outlet chamber 37. Flow from the fitting 36 enters an extension 38 of the conduit 15 connected to the tank outlet fitting 9 at its lower end.

A service outlet pipe 39 communicates with a chamber 40 formed in the casing 32 and this chamber is in continuous communication with the inlet chamber 31 of the aspirator. Also formed in the casing 32 is a passage 41 arranged to by-pass the aspirator nozzle 35 to permit flow at an increased rate from the conduit extension 38 to the chamber 40. A check valve 42 of the flap type permits flow from passage 41 to chamber 40 but prevents reverse flow through the passage 41.

A second by-pass for the aspirator nozzle 35 and throat 36 comprises a conduit 43 having one end in communication with the chamber 37 and the other end in communication with the chamber 40. Flow through by-pass conduit 43 is under control of a valve 44 having a head adapted to be actuated by a solenoid plunger under control of a solenoid coil in a housing 45. This valve head is biased toward closed position by a spring 46 and is open only when the solenoid is energized. A function of the by-pass conduit 43 and valve 44 is to permit flow from the conduit 15 to the lower portion of the tank 6 at an increased rate during backwashing operation when the solenoid of this valve is energized. Another function of the by-pass 43 is to permit flow of brine make-up water back up through the throat 36 into the aspirator chamber 33 and thence through the conduit 34 to a brine flow control valve presently to be described.

As shown in FIG. 2, suction chamber 33 of the aspirator is connected by the conduit 34 to an inlet port 47 of a brine control valve 48. The casing of this valve is formed with a central chamber 49 and a port 50 communicating with a conduit 51 extending to the brine tank hereinafter described. Mounted within the chamber 49 is a pressure responsive closure member 52 of hexagonal shape in plan view as indicated in FIG. 3. Being loosely mounted in the chamber 49, the member 52 is adapted to close at a seat surrounding the port 50 when held down by pressure from above within the chamber 49. Flow of fluid past the hexagonal sides of the member 52 subjects the upper side of this member to the pressure either above or below atmospheric pressure created by flow through the conduit 34 to or from the aspirator chamber 33.

A flow control plug 53 formed with a restricted passage 54 is mounted in a recess in the closure member 52 and a conical head 55 is disposed to close the passage 54. Head 55 is formed on the lower end of a solenoid plunger adapted to be actuated by a solenoid contained in a casing 56. A coiled spring is provided to bias the head 55 toward closed position with a light pressure so that closure member 52 together with the head 55 and solenoid plunger may be raised to open position by suction created in the chambers 33 and 49 when the aspirator is in operation. When the head 52 is held open by suction, brine may be drawn from the port 50 and conduit 51 at the rate required for regeneration. Make-up water passes in the reverse direction at a reduced rate through the passage 54 from the chamber 49 to the port 50 and conduit 51 when fluid under higher pressure is fed to the chamber 49. Such pressure causes the closure member 52 to be closed at its seat surrounding the port 50.

Referring to the modification shown in FIG. 4, flow through a by-pass conduit 43a for the aspirator is under control of the valve 44 actuated by the solenoid in casing 45. Conduit 43a has an outlet end connected to a brine control valve having a casing 58. There are three branches of this casing which forms a chamber 59 communicating with the conduit 43a. One branch forms a port 60 communicating with the brine tank through the conduit 51, a second branch has a port 61 communicating with the outlet chamber 37 of the aspirator and the third branch has a port 62 connected by a conduit 34a to the suction chamber 33 of the aspirator.

A pressure responsive closure member 63 is biased by a spring 64 to normally close at a seat surrounding the port 60. Mounted coaxially in the closure member 63 is a flow control plug 65 having an axial passage permitting flow at a controlled rate from the chamber 59 to the port 60 when the member 63 is held down by pressure in the chamber 59. A check ball 66 normally closes the port 62 and is adapted to be drawn up to open position when suction is created in the chamber 33. A second check ball 67 closes port 61 when reduced pressure is created in the chamber 59 and moves to open position when higher pressure in this chamber results from fluid flowing through the by-pass conduit 43a into the chamber 59.

In the modification shown in FIG. 6, the by-pass 43 and conduit 34 are arranged as indicated in FIG. 1 with reference to the aspirator but a modified brine control valve is shown having a casing 68 forming a chamber 69. One port of this chamber is connected by the conduit 34 to the suction chamber 33 and second and third ports comprise an inlet port 70 and an outlet port 71. Conduit 51 extending to the brine tank has a branch 72 comunicating with the port 70 and a branch 73 communicating with the port 71. A check valve 74 of the flap type controls flow to and from the branch 72 and is closed when fluid under pressure above atmospheric pressure is present in the chamber 69. Valve 74 is opened to allow flow of brine to the chamber 69 when subatmospheric pressure in the chamber 69 results from operation of the aspirator.

Mounted between the chamber 69 and port 71 is a flow control plug 75 having a restricted central passage. Plug 75, like the plugs 53 and 65 is constructed from resilient, compressible material adapted to restrict the central passage approximately in direct proportion to the fluid pressure exerted on the upstream side of the plug. The passage through the plug 75 is normally closed by a conical head 76 carried by a plunger 77 of a solenoid valve having a coil in a casing 78. Valve head 76 is biased by a spring 79 to close the passage in the plug 75 and is retracted to open this passage when the solenoid coil in casing 78 is energized.

Referring to FIG. 7, a suitable brine tank of the open type is indicated generally by the numeral 80. A supply of salt and brine is maintained in this tank and brine is fed to a brine well 81 through slots 82 in the lower portion of the well. The conduit 51 extends down into the well 81 and has an up-turned lower end portion which is connected to a valve body 83 formed with a port 84 and surrounding seat, adapted to be closed by a ball 85 of the float type. A screen cap 86 limits upward movement of the ball 85 and guides it to and from its seat. The ball 85 floats to open port 84 for flow out through the body 83 to the conduit 51 when the elevation of the brine in the well 81 is above a predetermined low level. When the level of brine reaches the predetermined minimum the ball 85 settles to close port 84 and stop flow of brine and air out through this port to conduit 51. An emergency overflow fitting 87 communicates with the interior of the well 81 at a suitable elevation and is connected to a drain line 88 extending to waste.

Valve head 25 for controlling flow through waste outlet conduit 22 is mounted on a solenoid plunger extending into the solenoid coil 27a in the casing 27. The second solenoid valve having the head 44 controlling flow through by-pass conduit 43 of FIGS. 1, 2 and 6 (or in the modification of FIG. 4 controlling flow through bypass conduit 43a) is connected to the plunger of a solenoid having a coil 45a (FIG. 8). For the third solenoid actuated valve shown in FIG. 2, the valve head 55 is operatively connected to the plunger of a solenoid having a coil 56a. For the modified brine control valve shown in FIG. 6, the solenoid coil for actuating the plunger head 76 may be arranged in a circuit like that shown in FIG. 8 with reference to the coil 56a.

Timing mechanism for the controls hereinbefore described are shown diagrammatically in FIGS. 8, 9 and 10. An electric motor 89 is operatively connected to a cam 90 so that the latter makes one revolution during a predetermined period of time during which the softener is to be regenerated. For example, for an installation where water softening apparatus is designed to be regenerated and placed back in service once in every twenty-four hours, the connections between the motor 89 and cam 90 may be such as to turn the latter one revolution in twenty-four hours. The cam is arranged to actuate spring contacts constituting switch members indicated by the numerals 91 and 92 and the latter are movable between spring terminal contacts 93 and 94. Current may be supplied to the motor 89 through current supply wires 95 and 96. Current for energizing the coil 27a may be supplied through a circuit comprising branches 97 and 98 of the current supply wire 95 extending to one terminal of the coil 27a and a wire 99 extending from the other terminal to spring contacts 91 and 92. A branch 100 of the supply wire 96 extends to the contact 94. Solenoid coil 45a is included in a circuit comprising branches 101 and 102 of the wire 95, the coil 45a and a wire 103 extending to the switch terminal contact 93. Solenoid coil 56a is included with wires 104 and 105 in a circuit parallel to the circuit including the coil 45a so that the coils 45a and 56a are energized simultaneously and then deenergized under control of the same pair of switch contacts.

Cam 90 has an elongated peripheral segment 106 of uniform radius and a helical segment 107 arranged to slidably engage spring contact 92 and terminating in a radial surface 108. From this surface another helical segment 109 extends to a radial surface 110 disposed to actuate and release spring contact 91.

*Operation*

During normal service operation the several controls are in the positions shown in the drawings and the circuits including the solenoid coils 27a, 45a and 56a are open. Valve heads 25, 44 and 55 are thus held in their closed positions by their springs and the head 17 of the main valve is in the position shown wherein flow is established from the supply pipe 13 through chambers 12 and 11 to conduit 16 and tank inlet fitting 7. Hard water flows from the distributor 6 through the bed of softening material 5 and soft water is discharged through the distributor 8, outlet fitting 9, conduit 38, chamber 37 and passage 41 to port 40 and service pipe 39, past check valve 42.

It may be assumed that during such service operation regenerating fluid in the well 81 is at a predetermined upper level and that the ball 85 is in its open floating position in relation to the port 84. In the brine flow control valve of FIG. 2 closure member 52 is closed, being held down by pressure in the chamber 49 and the head 55 is closed in relation to the restricted passage 54, thus cutting off flow to the open brine tank and well 81.

Referring to the modification shown in FIG. 4, during softening operation closure member 63 is held in closed position by pressure in the chamber 59 and flow from the aspirator chambers 33 and 37 to the chamber 59 is cut off by the check valves 66 and 67. Also during softening operation in the modified brine control valve shown in FIG. 6, check valve 74 is held in closed position relative to the port 70 and the head 76 is closed in relation to the passage through the plug 75 leading to the port 71.

For automatic operation the motor 89 is continuously energized so that the cam 90 is continuously rotated at the required low speed. Regeneration is started when the segment 107 of the cam 90 actuates the spring contact 92 to close the circuit between wire 99 and wire 100 at terminal contact 94, as indicated in FIG. 9. The circuit including the solenoid coil 27a is thereby energized but the circuit including coil 45a associated with valve 44 is held open by operation of the cam segment 109 which moves spring contact 91 to open the circuit between the wires 99 and 103. Valve head 25 is thereby actuated to open valve 24 and cause pressure in waste conduit 22 to be reduced substantially to that of the waste outlet which is ordinarily at atmospheric pressure. This reduces the pressure in the passage 21 and chamber 20 and causes the diaphragm 19 to move upwardly under the higher pressure exerted by the fluid in the chamber 11. Valve head 17 is thereby moved to its upper or second position wherein flow is cut off from the chamber 11 to the tank inlet 7 and flow is established from the pipe 13 through the chamber 14, conduit 15, aspirator nozzle 35 and throat 36. The aspirator is thus caused to discharge through the conduit 38 into the tank outlet 39 and distributor 8. This flow also causes fluid pressure in the chamber 33, conduit 34 (or conduit 34a of the modification shown in FIG. 4) to be reduced. Pressure in the several brine control valves of FIGS. 2, 4 and 5 is thereby reduced to cause brine to be drawn from the brine tank 80.

In the brine control valve shown in FIGS. 2 and 3, subatmospheric pressure in the chamber 49 causes the valve closure member 52 to be raised from the seat surrounding the port 50 together with the head 55. Suction in this port now draws brine through the conduit 51 from the brine well 81. This is fed through the conduit 34 to chamber 33 and brine mixed with water from the nozzle 35 is thus fed into the tank outlet 9 and flows upward through the bed 5 to the distributor 6 and tank inlet 7. From the latter the spent brine is discharged through conduit 16, port 29, flow regulating device 30, conduit 22 and valve 24 to the waste line 23. During regeneration, hard water is supplied to the service outlet pipe 39 through conduit 15 and chambers 31 and 40. Also during regeneration, the coil 45a of the solenoid valve 44 remains deenergized so that the aspirator is operative.

At the end of the predetermined period for regeneration the flow of brine is cut off by the settling of the ball 85 on its seat closing the port 84 but hard water continues to flow through the aspirator into the lower portion of the tank and from the upper portion of the tank to the waste outlet. This relatively slow rate of flow is increased for backwashing when segment 109 of the cam 90 releases spring contact 91, as indicated in FIG. 10, to close the circuit between the contacts 91 and 93. As a result both of the solenoid coils 45a and 56a are energized to open the valve 44 and head 55 of valve 48. Energization of the solenoid coil 27a also continues during the backwashing so that flow continues from the upper portion of the tank to and through the waste conduit 22. During this period when the valve 44 is open the rate of flow is increased by flow through the conduit 43 to chamber 37 and conduit 38. Backwash flow rate is regulated by the device 30 which discharges into the waste conduit 22. During this backwashing operation make-up water is fed to the brine tank through the flow control plug of any of our brine control valves. In the valve shown in FIG. 2, the head 55 is held by its energized solenoid in open relation to the restricted passage 54 in the plug 53. Water under pressure thus flows through this metering plug to port 50 and thence through the conduit 51 to the brine tank. This flow continues for the duration of the backwashing period which is controlled automatically by the opening and closing of the valves 44 and 55 of the control shown in FIGS. 1–3. In the modification shown in FIG. 6 the rate of flow is determined by the passage through the metering plug 75 and the duration of the flow of make-up water to the brine tank is controlled by the solenoid actuated valve having the head 76 which is held open in relation to the flow passage by the energization of the solenoid coil in casing 78. In this modified brine valve make-up water under pressure is fed from the conduit 43 under control of the valve 44 to the chamber 37 and thence through the throat fitting 36, chamber 33 and conduit 34 to the chamber 69. It will thus be evident that the duration of make-up water flow through metering plug 75 is under control of the solenoid actuated valves 44 and 76 and their automatic timing means.

In the modified brine control valve shown in FIG. 4, the duration of flow of make-up water through the control plug 65 is determined by the operation of the solenoid actuated valve 44 which supplies water under pressure above atmospheric pressure through the by-pass conduit 43a to the chamber 59. Elevated pressure in this chamber causes the ball check valves 66 and 67 to open thereby supplying water for backwash to the chambers 33 and 37 of the aspirator and thence through conduit 38 to the lower portion of the softener tank 4.

At the end of the predetermined periods of regeneration and backwashing the cam segment 109 frees spring contact 92 to allow this contact to spring away from contact 94, opening the circuit between the current supply wires 96 and 100 and the several solenoid coils 27a, 45a and 56a. Motor 89 continues to turn cam 90 slowly for a predetermined period of hours during which the circuits for energizing the solenoid coils remain open and the softener is in service furnishing soft water to the service outlet pipe 39.

It will be evident that our several improved brine flow control valves eliminate the need for float controlled valves in the brine tank for limiting the quantity of make-up water which is allowed to enter the brine tank. In each of the several forms of our invention the flow of make-up water is at a rate controlled by a restricted passage in a metering plug and the duration of flow to back wash is automatically timed to deliver a predetermined quantity of make-up water to the brine tank after each regenerating operation.

By simple modification of the cam 90 and its connections with the motor 89 and by the use of a manual switch or switches for starting and stopping the motor, our controls may be made semi-automatic. For semi-automatic operation the operator merely actuates the starter switch which initiates the cycle required for regeneration and backwashing of predetermined duration followed by automatic return of the apparatus to water softening operation.

We claim:

1. A brine supply system for water softeners of the type having a softener tank, a brine tank, a chambered aspirator having inlet and outlet chambers, a nozzle and a suction chamber interposed between said inlet and outlet chambers, said inlet chamber being connected to a supply of liquid under pressure and said outlet chamber being connected to said softener tank for supplying brine to said tank, the improvements which comprise, a conduit connecting said inlet chamber to said outlet chamber of the aspirator; a normally closed back flow valve controlling flow through said conduit, a brine control valve having a casing formed with a first port connected to said suction chamber and a second port connected to said brine tank, said brine control valve having a pressure responsive closure member controlling flow from said brine tank to said casing, said closure member being movable under reduced pressure in said casing to open said second port for flow from the brine tank to said suction chamber; a flow control plug disposed in said casing and having a restricted passage for flow to said brine tank when said closure member is held in closed position by higher fluid pressure within said casing; a second closure member normally closing said restricted passage to cut off flow of refill liquid through said passage to the brine tank, and timing means operatively connected to said back flow valve and to said second closure member respectively whereby flow through said conduit and restricted passage may be initiated and terminated at preselected times.

2. A brine supply system in accordance with claim 1 wherein said flow control plug is mounted on said closure member to move therewith and spring means are provided to bias said closure member toward closed position in relation to said second port.

3. A brine supply system in accordance with claim 1 wherein said brine control valve casing has separate inlet and outlet ports, a second conduit having branches connected to said inlet and outlet ports and extending into said brine tank, and wherein said pressure responsive closure member is disposed to control flow from said inlet port to said casing and said flow control plug is disposed to restrict flow to said outlet port from said casing.

4. A brine control system in accordance with claim 1 having electro-magnetic means for actuating said back flow valve and said second closure member to open said conduit and restricted passage respectively.

5. A brine supply system in accordance with claim 4 wherein said timing means comprise an electric motor, cam means operatively connected to said motor, electric switches disposed to be actuated at preselected times by said cam means and electric circuits including said switches and said electro-magnetic means for energizing the latter.

6. A brine control system in accordance with claim 5 in which a single cam actuated switch is provided for simultaneously closing and then simultaneously opening the electric circuits for activating said back flow valve and said second closure member.

7. In a brine supply system for water softeners of the type having a softener tank, a brine tank, an aspirator adapted to draw brine from said brine tank for delivery to said softener tank and a conduit connecting the aspirator to said brine tank, the improvements which comprise, a brine and make-up liquid flow control valve interposed in said conduit and having a chamber, a first port in continuous communication with said aspirator and a second port in continuous communication with the brine tank; said valve having a pressure responsive closure member controlling flow from the second port to the first port, said closure member being movable under reduced pressure in said chamber to open said second port for flow at a relatively high rate from the brine tank to the aspirator, a resilient elastic flow control plug disposed in said chamber having a restricted passage for flow at a relatively low rate from the first port to the second port when said closure member is held in closed position by fluid pressure in said chamber, a second closure member normally closing said passage in the flow plug, and timing means operatively connected to said second closure member whereby flow of refill liquid to the brine tank through said restricted passage may be established for a preselected period of time.

References Cited in the file of this patent
UNITED STATES PATENTS

| | | |
|---|---|---|
| 154,544 | Doten | Sept. 1, 1874 |
| 643,074 | Sweeney | Feb. 6, 1900 |
| 1,685,816 | Kenney | Oct. 2, 1928 |
| 1,976,439 | Dotterweich | Oct. 9, 1934 |
| 2,265,225 | Clark | Dec. 9, 1941 |
| 2,460,036 | Sebald | Jan. 25, 1949 |
| 2,524,635 | Pick | Oct. 3, 1950 |
| 2,715,098 | Whitlock | Aug. 9, 1955 |
| 2,722,514 | Sloan | Nov. 1, 1955 |
| 2,751,347 | Miller | June 19, 1956 |